T. B. McCONAUGHEY.
Cultivator.
No 57,747. Patented Sept 4, 1866.
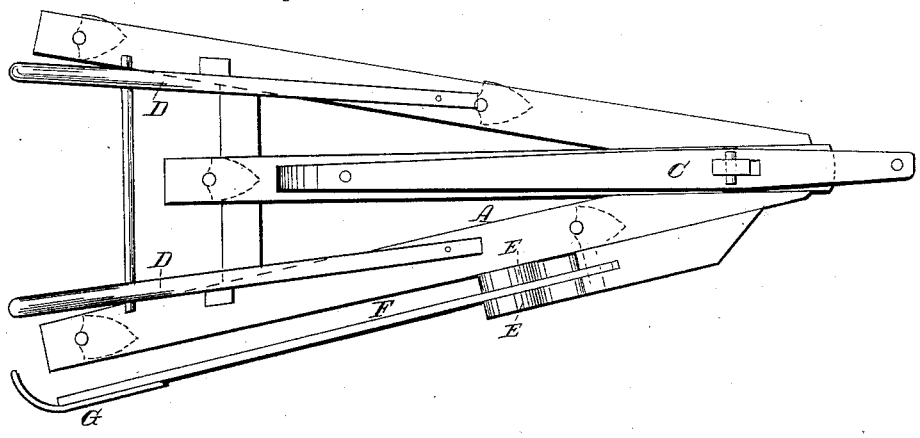
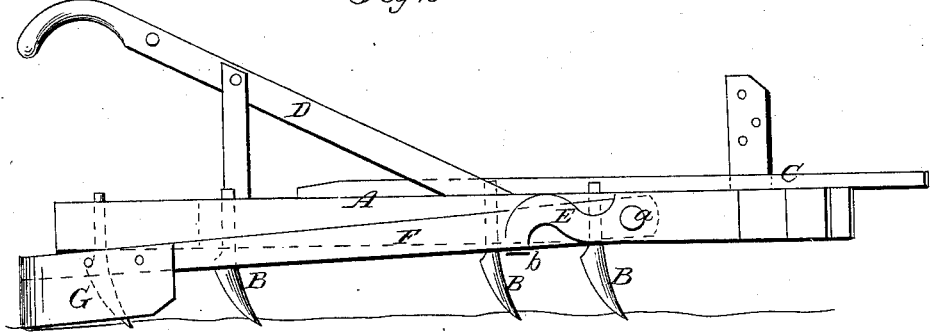

United States Patent Office.

THOS. B. McCONAUGHEY, OF NEWARK, DELAWARE.

IMPROVEMENT IN GUARD ATTACHMENTS FOR CULTIVATORS.

Specification forming part of Letters Patent No. 57,747, dated September 4, 1866; antedated August 28, 1866.

*To all whom it may concern:*

Be it known that I, THOMAS B. McCONAUGHEY, of Newark, New Castle county, State of Delaware, have invented a new and useful Guard Attachment for Cultivators; and I do hereby declare that the following is a full, clear, and exact description thereof, which will enable others skilled in the art to make and use the same, reference being had to the accompanying drawings, forming part of this specification, in which—

Figure 1 is a plan or top view of my invention; Fig. 2, a side view of the same.

Similar letters of reference indicate like parts.

This invention consists in applying to a cultivator a device which I term a "guard," constructed and arranged in such a manner as to prevent sods, clods of earth, &c., from being thrown upon the young plants, and obviate the necessity of a person following the cultivator, which is now necessary, in order to uncover the plants covered and crushed down by the ordinary cultivators in use.

A represents a cultivator, which may be of the ordinary V shape, and provided with teeth B and a draft-bar, C, as usual, and also provided with handles D.

To one side of the cultivator, near its forward end, there are attached metal plates E E, of curved form, between which the front end of a bar, F, is fitted, and secured by a pivot-bolt, *a*. The outer ends of these plates E E, which extend downward, owing to their curved form, are connected by a strip, *b*, which serves as a rest for the bar F, limiting its downward movement. This bar F is allowed to rise and fall freely, as it is fitted loosely on the pivot-bolt *a*, and the plates E E prevent the bar F from working laterally.

At the rear end of the bar F there is attached a metal plate, G, which is directly opposite the rear tooth, B. The rear teeth of the cultivator are the ones which pass nearest to the rows of plants and cover them with earth or throw sods or clods of earth upon them. The plate G effectually prevents this result. The pivoted bar F allows the plate G to rise and fall, to conform to the inequalities of the surface of the earth over which it may pass.

There may be a bar, F, and plate G at each side of the cultivator, if desired. This would be preferable in those cases where the cultivator extends across the space between the rows of plants, so that the rear teeth at both sides of the cultivator work in close contact with the plants and one side of two adjoining rows are plowed simultaneously; but in those cases where only one side of a row is plowed at once, and the cultivator passes twice through each space between the rows, only one bar and plate at one side of the machine are necessary.

The bar F is designed to have sufficient elasticity to admit of clods or sods passing between it and the opposite rear tooth, B, of the cultivator.

Having thus described my invention, what I claim as new, and desire to secure by Letters Patent, is—

1. The application of a guard or guards to a cultivator, substantially in the manner as and for the purpose herein set forth.

2. Pivoting the bar F, to which the plate or guard G is attached, between plates E E, secured to the cultivator near its front end, and provided with a rest, *b*, substantially as described.

THOMAS B. McCONAUGHEY.

Witnesses:
JESSE S. KENNEDY,
CHAS. C. KING.